US012601817B2

(12) United States Patent
Michel et al.

(10) Patent No.: US 12,601,817 B2
(45) Date of Patent: Apr. 14, 2026

(54) LIDAR SYSTEM CALIBRATION

(71) Applicant: OFFICE NATIONAL D'ETUDES ET DE RECHERCHES AÉROSPATIALES, Palaiseau (FR)

(72) Inventors: David Tomline Michel, Orsay (FR); François Gustave, Cachan (FR)

(73) Assignee: OFFICE NATIONAL D'ETUDES ET DE RECHERCHES AÉROSPATIALES, Palaiseau (FR)

( * ) Notice: Subject to any disclaimer, the term of this patent is extended or adjusted under 35 U.S.C. 154(b) by 973 days.

(21) Appl. No.: 17/786,266

(22) PCT Filed: Dec. 7, 2020

(86) PCT No.: PCT/EP2020/084844
§ 371 (c)(1),
(2) Date: Jun. 16, 2022

(87) PCT Pub. No.: WO2021/122093
PCT Pub. Date: Jun. 24, 2021

(65) Prior Publication Data
US 2023/0028596 A1 Jan. 26, 2023

(30) Foreign Application Priority Data
Dec. 20, 2019 (FR) ...................................... 1915061

(51) Int. Cl.
| | |
|---|---|
| *G01S 7/497* | (2006.01) |
| *G01S 7/481* | (2006.01) |
| *G01S 17/10* | (2020.01) |
| *G01S 17/95* | (2006.01) |

(52) U.S. Cl.
CPC ............ *G01S 7/497* (2013.01); *G01S 7/4818* (2013.01); *G01S 17/10* (2013.01); *G01S 17/95* (2013.01)

(58) Field of Classification Search
CPC .............................. G01S 17/95; G01S 7/48–51
See application file for complete search history.

(56) References Cited

U.S. PATENT DOCUMENTS

| | | | | | |
|---|---|---|---|---|---|
| 5,621,807 | A | * | 4/1997 | Eibert ..................... | G01S 17/89 356/3.16 |
| 5,825,464 | A | * | 10/1998 | Feichtner .............. | G01S 7/4818 356/4.02 |
| 2012/0050750 | A1 | | 3/2012 | Hays et al. | |

(Continued)

OTHER PUBLICATIONS

International Search Report for PCT/EP2020/084844, mailed Jan. 13, 2021, 4 pages.

(Continued)

*Primary Examiner* — Yuqing Xiao
*Assistant Examiner* — Chia-Ling Chen
(74) *Attorney, Agent, or Firm* — Maier & Maier, PLLC

(57) ABSTRACT

A method for calibrating a LIDAR system proposes incorporating in the LIDAR system a reference optical path which is formed from an optical fiber. The length of the optical fiber determines a measurement reference value, which can then be used to evaluate distances of targets to be characterized using the LIDAR system. The calibration method is simple and economical to implement. It may be used in particular for a LIDAR system which is designed to perform air speed measurements, in particular on board an aircraft.

17 Claims, 5 Drawing Sheets

(56)         References Cited

U.S. PATENT DOCUMENTS

| | | | | |
|---|---|---|---|---|
| 2012/0274937 A1* | 11/2012 | Hays | ..................... | G01S 17/95 |
| | | | | 356/450 |
| 2014/0160488 A1* | 6/2014 | Zhou | .................. | A61B 5/0066 |
| | | | | 356/479 |
| 2015/0355327 A1* | 12/2015 | Goodwin | ............... | G01S 17/26 |
| | | | | 359/198.1 |
| 2020/0096328 A1* | 3/2020 | Raab | ................ | G01B 11/2522 |

OTHER PUBLICATIONS

Written Opinion of the ISA for PCT/EP2020/084844, mailed Jan. 13, 2021, 7 pages.

* cited by examiner

LIDAR SYSTEM CALIBRATION

This application is the U.S. national phase of International Application No. PCT/EP2020/084844 filed Dec. 7, 2020 which designated the U.S. and claims priority to FR Patent Application No. 1915061 filed Dec. 20, 2019, the entire contents of each of which are hereby incorporated by reference.

TECHNICAL FIELD

This description relates to a method for calibrating a LIDAR system, as well as to a LIDAR system suitable for implementing such a calibration method.

PRIOR ART

LIDAR systems are used for many applications, some of which consist of measuring a separating distance of a target. Other applications consist of measuring an external quantity for at least one value of the separating distance of a location to which the measurement relates, even if the measurement of this separating distance does not constitute the main objective of the application considered. Such is the case of anemometric measurements, which are based on detecting a portion of a laser beam which is backscattered by particles in suspension in the air. The intensity of the portion of the laser beam which is backscattered and then detected by the LIDAR system is then very low. A particle speed value is deduced from a spectral analysis of the backscattered portion of the laser beam which is detected by the LIDAR system, then from a Doppler effect calculation which is applied to a frequency difference identified between this backscattered portion of the laser beam and the laser beam as emitted by the LIDAR system.

However, in a monostatic LIDAR system, a residual reflection of the emitted laser beam occurs on the optical components which are common to the emission and detection channels of the LIDAR system, even if these components are provided with anti-reflective coatings. The radiation which is thus reflected internally to the LIDAR system is then detected by the detection channel. This reflection signal internal to the LIDAR system is often referred to as "narcissus". It is commonly used to constitute a distance reference of zero or of a low fixed value, in order to calibrate the system for distances to be measured, or for distances that appear when other quantities are measured using the LIDAR system. However, the intensity of the emitted laser beam is high, and the detection sensitivity of the LIDAR system may be very high, in particular when it is designed to detect radiation that is backscattered by particles in the atmosphere. The narcissus signal then has the following characteristics:

it is generated by reflections of the laser beam on several optical components common to the emission and detection channels of the LIDAR system, so it does not correspond to a single distance value where a reflection occurs; and its intensity is much higher than the usual levels of intensity of the radiation backscattered by atmospheric particles, so that it causes saturation of the detector of a LIDAR system which is designed to detect radiation as produced by backscattering atmospheric particles.

For these reasons, the narcissus signal cannot provide an accurate distance reference. In addition, for a monostatic LIDAR system, it prevents satisfactory detection of radiation resulting from retroreflections or backscattering on targets located at short distances from the LIDAR system, typically located at distances between 20 m (meters) and 150 m. The zone that extends from the output of a monostatic LIDAR system to the minimum distance for which a measurement may be inhibited by the narcissus signal is then commonly called the blind zone.

Another method for distance calibration of a LIDAR system consists of placing a retroreflective target at a known distance in front of the LIDAR system, beyond the blind zone, then performing a measurement sequence with this target. But such a method is tedious to implement, and therefore cannot be repeated frequently. Furthermore, when the LIDAR system is of the pulsed type, such calibration must be performed with pulses similar to those used for useful measurement sequences. For pulses which are long, for example of individual durations greater than 0.5 µs (microseconds), this requires placing a target more than 75 m (meters) away from the LIDAR system, which is very complicated in practice.

Finally, document U.S. Pat. No. 5,825,464 proposes a calibration device for a LIDAR system which is external to the LIDAR system to be calibrated, and which is to be optically coupled to it using an integrating sphere.

Technical Problem

Based on this situation, an object of the present invention is to make it possible to perform distance calibration of a LIDAR system more easily and more precisely than by using the previous methods.

In particular, for a monostatic LIDAR system, an object of the invention is to allow such distance calibration which is not hindered by the narcissus signal.

Another object of the invention is to allow such calibration to be repeated as often as desired, without requiring a target to be placed at a determined distance in front of the LIDAR system.

Yet another object of the invention may be to allow carrying out a distance calibration each time a useful measurement sequence is carried out, or even at the same time as this useful measurement sequence.

SUMMARY OF THE INVENTION

To achieve at least one of these or other objects, a first aspect of the invention proposes a new method for calibrating a LIDAR system, in order to provide a measurement reference value which corresponds to a free-space propagation distance reference value, these measurement and free-space propagation distance reference values being intended to be used for calibration of the LIDAR system in order to evaluate a distance of at least one target to be characterized using the LIDAR system. The method of the invention comprises the following steps:

/1/ coupling the LIDAR system to a reference optical path which is formed from at least one optical fiber efficient for guiding radiation emitted by the LIDAR system during an operation of the system, so that at least a portion of the radiation travels the reference optical path between an emission channel and a detection channel of the LIDAR system, the reference optical path having a known length;

/2/ carrying out a distance measurement sequence using the LIDAR system coupled to the reference optical path as resulting from step /1/, in order to obtain a measurement value which is representative of a time of radiation propagation in the reference optical path, and which is intended to constitute the measurement reference value; then /3/ converting the known length of the reference optical path into a free-space propagation distance value for the radiation, according to a principle of propagation time equality, to form the free-space propagation distance reference value, and associating this free-space propagation distance reference value with the measurement reference value in order to constitute the calibration of the LIDAR system.

Thus, the method of the invention uses a reference optical path to be optically coupled to the LIDAR system. This reference optical path, which is based on at least one optical fiber, physically determines the free-space propagation distance reference value. This free-space propagation distance reference value is thus known with a high level of accuracy. Thanks to such calibration method, distance values that are determined from operations of the LIDAR system for targets to be characterized, can have improved accuracies and high precision.

In general, the method of the invention is compatible with a LIDAR system of the monostatic or bistatic type. In the context of the invention, monostatic is understood to mean a LIDAR system for which optical output and detection apertures of this LIDAR system are coincident, contiguous, or close to each other in comparison to the separating distance of the target to be characterized. Conversely, bistatic means a LIDAR system for which the optical output and detection apertures are spaced apart.

Also generally, the LIDAR system may be suitable for characterizing a single target or a diffuse set of multiple targets that are distributed within a space zone, during each measurement operation of this LIDAR system. In particular, the invention may be applied to a LIDAR system which is designed to perform anemometric measurements, by implementing a laser radiation emitted by the LIDAR system at each measurement cycle, part of which is backscattered by particles suspended in the air. Such particles may be aerosols, dust, ice grains, etc., which are suspended in atmospheric air, and which together form the target to be characterized. The separating distance of the target is then the distance from a zone which contains the particles, to which the measurement result relates, for example an anemometric measurement.

Depending on the configuration of the reference optical path with respect to the optical fiber used to constitute it, the length of this reference optical path may be linked to that of the optical fiber, or linked to twice the length of the optical fiber. In addition, in step /3/, the conversion of the length of the reference optical path into a free-space propagation distance for the radiation takes into account a difference in propagation speed, of the radiation emitted by the LIDAR system, which exists between its propagation in guided form in the optical fiber and its propagation in free-space space.

Advantageously, the optical fiber may have a length such that the free-space propagation distance which corresponds to the length of the reference optical path is greater than any blind zone of the LIDAR system, when the system is of the monostatic type. For this purpose, the method of the invention may further comprise the following preliminary step, to be performed before step /1/ when the LIDAR system is of the monostatic type whereby optical output and detection apertures of the LIDAR system are coincident:

/0/ determining a distance limit value such that portions of the radiation emitted by the LIDAR system which are reflected by components internal to this LIDAR system, correspond to times between emission and detection which are equivalent to those of targets located at less than this distance limit value in front of an optical output aperture of the LIDAR system.

The components internal to the LIDAR system which are likely to partially reflect the emitted radiation, i.e. to produce the narcissus signal, may be an exit window, polarization control components, one or more focus lens(es), etc. The smallest distance limit value that can be determined in this manner is the length of the blind zone. The length of the reference optical path may then preferably be selected such that the free-space propagation distance value is greater than the distance limit value determined in step /0/.

For example, the length of the optical fiber may be such that the free-space propagation distance reference value is greater than 150 m.

According to the invention, the reference optical path which is formed from the at least one optical fiber is incorporated inside the LIDAR system. It is thus available within the LIDAR system, for performing or repeating calibrations of the system as often as desired during the lifetime of the LIDAR system, each time using the method of the invention.

The reference optical path which is formed from the at least one optical fiber may be adapted to be optically coupled in a reversible manner to the LIDAR system in step /1/, so as to be able to be optically decoupled during measurement sequences useful for characterizing targets. In particular, it may optionally be optically decoupled from the optical output aperture of the LIDAR system, and possibly also optically decoupled from the optical detection aperture of the LIDAR system.

Advantageously, the optical fiber which is used for the reference optical path may be arranged in the form of a coil. The reference optical path can thus be light and compact, so that its integration into the LIDAR system is easy, including for a LIDAR system which is intended to be on board a carrier such as an aircraft, for example to perform anemometric measurements.

In general, the reference optical path may be optically coupled to the LIDAR system reversibly and temporarily, for the duration of the calibration process, by a controlled optical coupling component, then possibly decoupled for useful measurement sequences.

Alternatively, the reference optical path may remain optically coupled to the LIDAR system continuously during a useful measurement sequence, in order to perform calibration of the LIDAR system using a portion of the same radiation as that which is emitted by this LIDAR system to perform the useful measurement. Such calibration is therefore applied directly to the conditions for carrying out the useful measurement, in particular to the radiation used for the measurement. The validity of the calibration is thus not subjected to doubt by any deficiencies in the repeatability of the radiation emitted by the LIDAR system. This advantage is all the more significant when the radiation is emitted in the form of pulses for the useful measurement, where some features such as an envelope shape or a central optical frequency value of each pulse may vary randomly or drift progressively.

The method of the invention may further comprise the following additional steps, which constitute a useful measurement sequence carried out based on the calibration method:

/4/ performing a measurement relating to the at least one target to be characterized by directing a line of sight of the LIDAR system towards this at least one target independently of the reference optical path, so as to collect another measurement value which is representative of the separating distance of the at least one target; then /5/ calculating a value for this separating distance by combining the so-called another measurement value with the measurement reference value and with the free-space propagation distance reference value which corresponds to the length of the reference optical path.

Thus, in some possible implementations of the invention, the reference optical path which is formed from the at least one optical fiber may be optically coupled to the LIDAR system in a continuous manner during step /4/, so that a first portion of a radiation emitted by this LIDAR system is used to carry out the measurement relating to the at least one target, and so that a second portion of the same radiation is used simultaneously to obtain the measurement value representative of the time of propagation in the reference optical path. The measurement reference value which is constituted by the time of propagation in the reference optical path as measured during step /4/ can thus be used in step /5/.

The LIDAR system to which the method of the invention is applied may be adapted to carry out measurements according to any principles, including time-of-flight measurements and measurements based on radiation absorption levels, etc. However, the LIDAR system may preferably be adapted to carry out measurements according to a principle of heterodyne detection, including to provide the measurement reference value in step /2/, and where appropriate to also provide in step /4/ the another measurement value which is representative of the separating distance of the at least one target to be characterized.

According to a first possible configuration for the reference optical path, a first end of the optical fiber may be coupled in step /1/ to the emission channel of the LIDAR system, and a second end of this optical fiber, which is opposite to its first end, may be coupled to the detection channel of the LIDAR system. Thus, at least a portion of the radiation emitted by the LIDAR system enters the optical fiber through its first end, then exits through its second end while being transmitted to the detection channel of the LIDAR system. Such configuration of the reference optical path is compatible with LIDAR systems of both the monostatic and bistatic types. For such first configuration of the reference optical path, the free-space propagation distance reference value is related to one time the length of the optical fiber.

According to another possible configuration of the reference optical path which is compatible with monostatic LIDAR systems, the optical fiber of the reference optical path may have a first end and a second end, the latter being opposite to the first end and provided with a reflector. Radiation which propagates in the optical fiber from the first end is thus retroreflected by the reflector at the second end, inside the optical fiber and toward the first end. Step /1/ then comprises coupling the LIDAR system to the optical fiber so that at least a portion of the radiation emitted by the LIDAR system enters the optical fiber through its first end, and at least a portion of the retroreflected radiation that exits through this same first end is transmitted to the detection channel of the LIDAR system. For this other configuration of the reference optical path, the free-space propagation distance reference value is related to twice the length of the optical fiber.

When the LIDAR system is monostatic, and the reference optical path is coupled to this LIDAR system only by the first end of the optical fiber, the second end being provided with a reflector, the first end of the optical fiber may be optically coupled to an optical input-output aperture of an optical circulator of the LIDAR system, this optical circulator also coupling the emission and detection channels of the LIDAR system to an optical output aperture of this LIDAR system. The optical circulator thus transmits the radiation, during step /2/, from the LIDAR system to the optical fiber through the optical input-output aperture of the optical circulator, and also transmits the radiation received by this same optical input-output aperture of the optical circulator and coming from the optical fiber, to the detection channel of the LIDAR system during the same step /2/. In this case, the reference optical path may also be adapted, or provided with radiation polarization control means, so that the optical circulator is efficient during step /2/. Alternatively, such polarization control means may be integrated into the optical circulator. The input-output aperture of the optical circulator which is used to couple the first end of the optical fiber in steps /1/ and /2/ may or may not also be used in step /4/ for the radiation used during this useful measurement sequence. When the reference optical path is coupled to an optical input-output aperture of the optical circulator which is different from the one used to emit radiation towards the target to be characterized during a useful measurement sequence, a new distance calibration of the LIDAR system may be performed simultaneously with each useful measurement sequence. In particular, such embodiment of the invention can be obtained by coupling together the emission and detection channels of the monostatic LIDAR system by using an optical circulator based on a polarizing cube. In this case, two optical input-output apertures of the optical circulator which consist of two different faces of the polarizing cube may be dedicated, one to transmitting a main portion of the radiation toward the target to be characterized, and the other to simultaneously transmitting a secondary portion of the radiation to the reference optical path.

Preferably, the reference optical path may be coupled to the emission channel of the LIDAR system downstream, in the direction of propagation of the radiation in this emission channel, from an optical amplifier which is part of the emission channel. In this manner, deformations which affect radiation pulses used during each measurement sequence, and which are caused by this optical amplifier, are identical between the radiation which travels the reference optical path and the radiation which is retroreflected or backscattered by the target to be characterized. These deformations are thus effectively taken into account in the method of the invention, in order to reduce the error they could cause on a distance measurement result obtained for the target to be characterized.

According to an optional improvement of the invention, which may further improve the accuracy of the distance calibration of the LIDAR system, the free-space propagation distance reference value may be set in accordance with a differential assessment of delays in transmission, detection, and/or signal processing which are effective for the radiation of the LIDAR system, between the emission and detection paths of this radiation which are used during step /2/, and other radiation emission and detection paths which are used to characterize the at least one target, that is which are used in step /4/.

A method in accordance with the invention may advantageously be used in particular for a LIDAR system of the type with separate radiation pulses. For such a pulsed LIDAR system, the distance of the at least one target to be characterized is evaluated in accordance with a time between an emission of a radiation pulse toward this (these)

target(s), and a detection of a portion of this radiation pulse which has been reflected or backscattered by the target(s).

In such a case of a pulsed LIDAR system, the method of the invention may further comprise performing at least one among:

a pulse envelope characterization, relating to a radiation pulse emitted and then detected by the LIDAR system;

a characterization of a frequency shift, as appearing between the radiation pulse as emitted by the LIDAR system and the same radiation pulse as subsequently detected by the LIDAR system; and a characterization of a deformation of the radiation pulse envelope, this deformation being caused by saturation of the detection channel of the LIDAR system.

This or these additional characterization(s) may be carried out based on a detection signal produced by the LIDAR system during step /2/, for one or more successive executions of this step /2/. The calibration method of the invention can thus be supplemented to constitute a test of the proper operation of the LIDAR system, and to calibrate the LIDAR system in frequency shift as well. Such a frequency shift calibration makes it possible to measure target velocities more accurately, in particular for anemometric measurements.

In general for the invention, the reference optical path may be provided with an intensity attenuator, which is arranged to attenuate an intensity of the radiation transmitted by the optical fiber to the detection channel of the LIDAR system. Such an intensity attenuator is preferably variable. It may in particular comprise an iris diaphragm which is arranged at one end of the optical fiber.

Also in general for the invention, the LIDAR system may be adapted for at least one of the following applications:

meteorological measurements, for example measurements of atmospheric turbulence;

measurements of atmospheric pollutant diffusion;

measurements of shear of an atmospheric flow, for example at an airport;

measurements of position and lifetime of at least one vortex present in a flow of fluid, in particular measurements of the positions of vortex cores;

anemometric measurements performed from an aircraft in flight, in particular from an airship or drone;

anemometric measurements performed to optimize zn operation of a wind turbine; and anemometric measurements performed to adjust a flight of aircrafts in formation, or to adjust the flight of a drone.

Finally, when the LIDAR system is monostatic and adapted to focus the radiation emitted in each measurement sequence at a focusing distance in front of the optical output aperture of this LIDAR system, a sequence of measuring this focusing distance may comprise the following steps:

controlling the LIDAR system to emit at least one radiation pulse, then collecting a detection signal which is produced by the detection channel of the LIDAR system, corresponding to portions of the emitted radiation which have been backscattered at varying distances;

determining a detection instant which corresponds to a maximum in a signal-to-noise ratio for the collected detection signal; then calculating a distance value which is associated with the determined detection instant, using the free-space propagation distance reference value which corresponds to the length of the reference optical path, and assigning the calculated distance value to the focusing distance.

To increase the accuracy of the value thus determined for the focusing distance, short pulse(s) may preferably be used.

A second aspect of the invention relates to a LIDAR system which is provided with a reference optical path formed from at least one optical fiber efficient for guiding radiation emitted by this LIDAR system during operation of the system. Thus, at least a portion of the radiation travels the reference optical path between an emission channel and a detection channel of the LIDAR system. The LIDAR system is further adapted to implement a calibration method which is in accordance with the first aspect of the invention, possibly with the cited improvements and optional additional features. In particular, the reference optical path which is formed from the at least one optical fiber is incorporated inside the LIDAR system.

Preferably, the reference optical path may be optically coupled to the emission channel and to the detection channel of the LIDAR system, in parallel with a path external to the LIDAR system which is intended to be followed by radiation emitted by the system toward the at least one target, and useful for evaluating the separating distance of this target. In this manner, the radiation coming from the emission channel is transmitted simultaneously in the reference optical path and toward the at least one target, and a same detection sequence provides both the measurement reference value and another measurement value that relates to the external path to the target.

In particular, a LIDAR system in accordance with the second aspect of the invention may have at least one of the following features:

it may be adapted to implement a heterodyne detection mode;

it may be of a type with separate radiation pulses, for which the separating distance of the target(s) to be characterized is evaluated based on a time between an emission of a radiation pulse toward this (these) qjtarget(s), and a detection of a portion of the radiation pulse which has been reflected or backscattered by the target(s);

it may comprise a laser source, for producing the radiation emitted toward the target(s) to be characterized; and it may be adapted to measure at least one atmospheric quantity, in particular a wind speed, based on a portion of the radiation emitted by the LIDAR system, this portion of the radiation being backscattered by particles in suspension in the atmospheric air, then detected by the LIDAR system.

BRIEF DESCRIPTION OF THE FIGURES

The features and advantages of the invention will become more clearly apparent from the detailed description below of some examples of non-limiting embodiments, with reference to the appended figures, in which.

DETAILED DESCRIPTION OF THE INVENTION

For clarity sake, the dimensions of the elements represented in these figures correspond neither to actual dimensions nor to actual dimensional ratios. In addition, the elements represented are only represented symbolically, it being understood that components which are not directly concerned by the invention, or which can be spontaneously adapted by the Man skilled in the art, are not represented or described. Finally, identical references indicated in different figures designate elements which are identical or which have identical functions.

The invention is now described, by way of example, for a monostatic LIDAR system of the pulse type with heterodyne detection. However, based on the description which follows, the invention can easily be transposed to other types of LIDAR systems, in particular continuous emission LIDAR systems, and to detection modes other than heterodyne detection. In general, the invention relates to the conversion of measurement values delivered by a LIDAR system into distance values. Each measurement value is representative of a time, measured by the LIDAR system, between the emission of radiation by this system and its subsequent detection. However, this measurement value may be a time offset, an electrical voltage, a frequency deviation, etc., depending on the detection mode and the type of signal processing that are used in each LIDAR system. Furthermore, as examples, the LIDAR systems described below are suitable for carrying out anemometric measurements by using a backscattering of laser radiation, produced by particles in suspension in the air. These backscattering particles, which constitute the target to be characterized, are designated by the reference 100 in [FIG. 2].

Figure 1A:
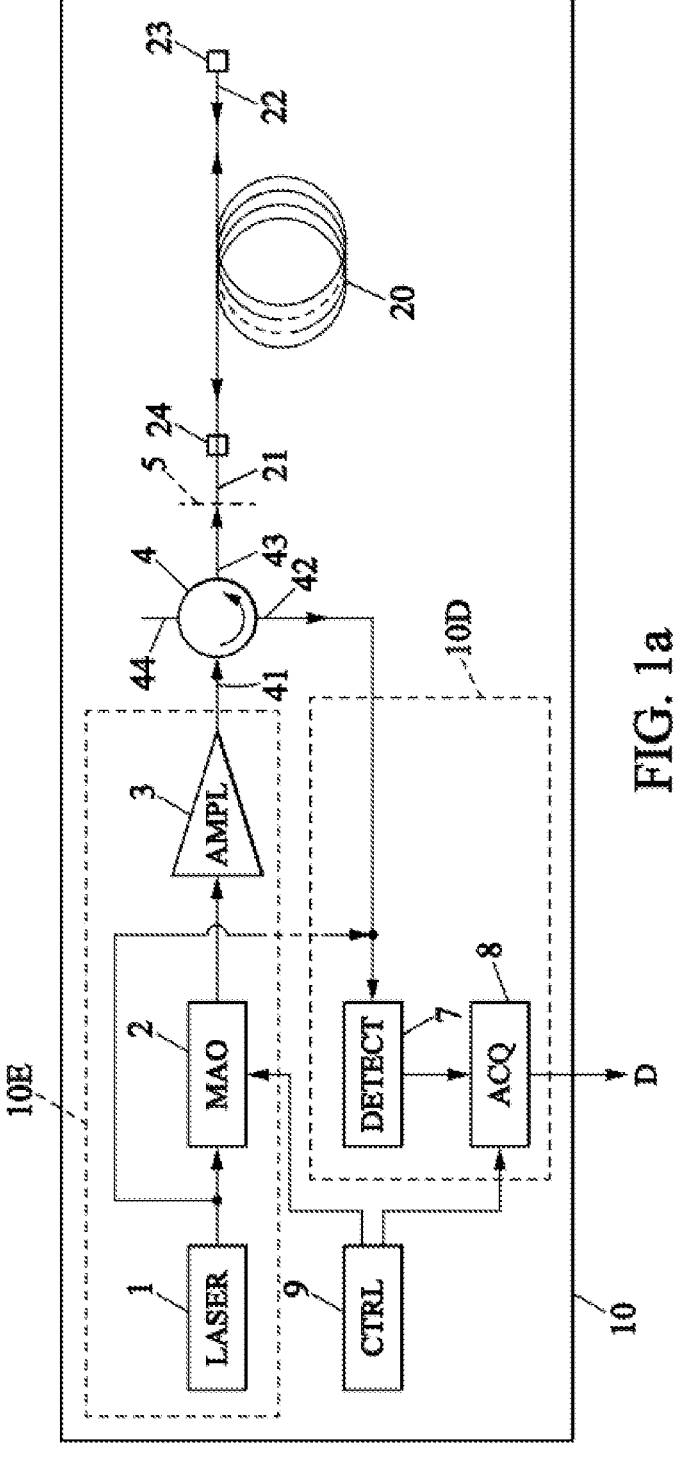
FIG. 1a is a block diagram of a first type of LIDAR system to which the invention can be applied.

According to [FIG. 1a], the LIDAR system 10 comprises an emission channel 10E and a detection channel 10D. The emission channel 10E comprises a laser source 1, which produces monochromatic radiation which may have a wavelength equal to 1545 nm (nanometers) when this radiation propagates in the air, at least one acousto-optic modulator 2, denoted MAO and controlled to form successive pulses from the laser radiation produced by the source 1, and an optical amplifier 3, denoted AMPL. The acousto-optic modulator 2 further produces a frequency shift of the laser radiation emitted by the LIDAR system 10 towards a target, relative to the laser radiation as produced by the source 1. In this manner, a heterodyne detection signal which is delivered by the detection channel 10D has a non-zero beat frequency when the radiation is retroreflected by a stationary target. The detection channel 10D comprises a detector 7, denoted DETECT, and a capture card 8, denoted ACQ. The capture card 8 is connected so as to receive an electric heterodyne detection signal which is produced by the detector 7, so as to apply processing to this signal in order to deduce therefrom a measurement value which is representative of the time between the emission of a pulse of laser radiation via the emission channel 10E, and the detection of a portion of this pulse as received by the detection channel 10D, then to convert this measurement value into a distance value D from the particles which backscattered the laser radiation. Possibly, an electrical signal amplifier, not shown, may be used on the link transmitting the electrical signal between the detector 7 and the capture card 8. In accordance with heterodyne detection mode, the detector 7 receives as input a mixture of the portion of each pulse which has been received by the detection channel 10D, and a portion of the emission laser radiation which is sampled between the source 1 and the acousto-optic modulator 2. In a known manner, the portion of the emission laser radiation which is transmitted to the detector 7 from the emission channel 10E may undergo various intermediate transformations, between its sampling in the emission channel 10E and the detector 7. The acousto-optic modulator 2 and the capture card 8 are controlled by a controller 9, which is denoted CTRL and provides the system with its LIDAR function.

When the LIDAR system 10 is of the monostatic type, the emission 10E and detection 10D channels may be coupled by an optical circulator 4 to an optical aperture 5, the aperture acting both as an optical output aperture for outputting the radiation to outside the LIDAR system for the emission channel 10E and as an optical detection aperture for the detection channel 10D, for collecting backscattered radiation coming from outside the LIDAR system. The emission channel 10E is then optically coupled to an optical input aperture 41 of the optical circulator 4, the detection channel 10D is optically coupled to an optical output aperture 42 of the optical circulator 4, and the optical aperture 5 of the LIDAR system 10 is optically coupled to a combination optical input-output aperture 43 of the optical circulator 4.

Figure 1B:
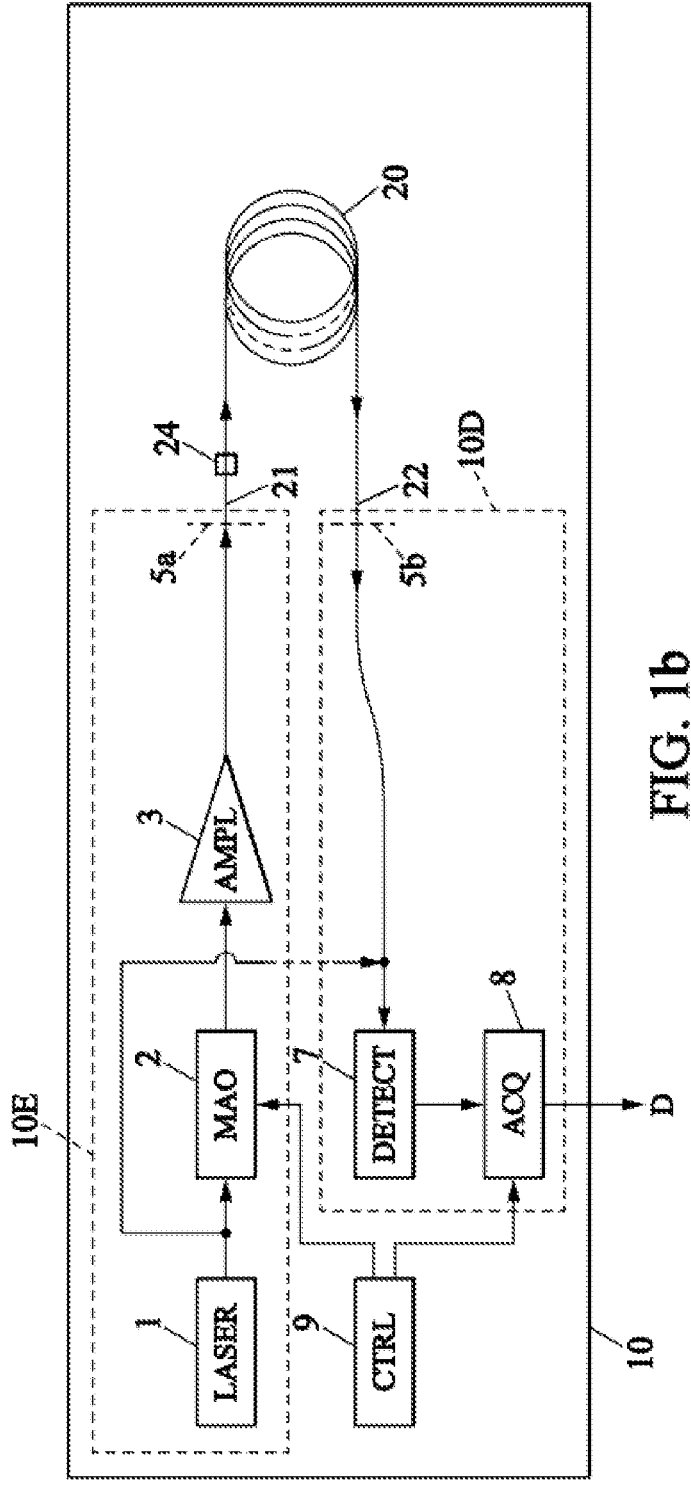
FIG. 1b corresponds to [FIG. 1a] for a second type of LIDAR system to which the invention can also be applied.

In an alternative configuration of the system 10, which is illustrated by [FIG. 1b], the optical output aperture 5a of the emission channel 10E and the optical detection aperture 5b of the detection channel 10D may be separate. No optical circulator is then used between the emission 10E and detection 10D channels. The optical output aperture 5a is arranged to transmit radiation coming from the emission channel 10E to outside the LIDAR system, and the optical detection aperture 5b is arranged to collect backscattered radiation coming from outside the LIDAR system. When the optical apertures 5a and 5b are contiguous or sufficiently close to each other, the LIDAR system 10 is still of the monostatic type.

The invention which is the subject of this description relates in particular to the conversion which is carried out within the capture card 8, from a measurement value which is representative of the time between the emission of a pulse and its detection after backscattering, into a separating distance value D of the particles which produced the backscatter. This conversion requires a calibration step, which is carried out according to the invention by coupling a reference optical path to the LIDAR system 10. This reference optical path comprises an optical fiber 20 of known length, denoted L, and may have several configurations. It is incorporated into the LIDAR system 10, for example by being housed within a casing thereof.

According to a first possible configuration of the reference optical path, which is represented in [FIG. 1a], the optical fiber 20 is coupled to the optical aperture 5 of the LIDAR system 10 by a first end of this optical fiber, designated by the reference 21. The opposite end of the optical fiber 20, which is designated by the reference 22, may be provided with a reflector 23 that is effective for the wavelength of the radiation emitted by the LIDAR system 10. In this case, the length of the reference optical path corresponds to a round trip of the radiation within the optical fiber 20. It is denoted $D_{ref}$ and is equal to $2 \cdot L \cdot n_{eff}$, where $n_{eff}$ designates the effective index of the optical fiber 20 for the wavelength of the radiation emitted by the LIDAR system 10. In other words, the propagation speed of the radiation emitted by the LIDAR system 10 within the optical fiber 20 is $C/n_{eff}$, where C is the free-space propagation speed of the radiation in air. In the general part of this description, $D_{ref}$ has been referred to as the free-space propagation distance reference value, "free-space propagation" denoting a propagation of radiation in air, as opposed to guided propagation of radiation within the optical fiber 20. The wavelength of a radiation designates its spatial period when it propagates in free space in the air.

According to a second possible configuration of the reference optical path, represented in [FIG. 1*b*], the optical fiber 20 is coupled to the optical output aperture 5*a* of the LIDAR system 10 by end 21, and simultaneously coupled to the optical detection aperture 5*b* by its other end 22, without using a reflector 23. End 21 carries out the transmission of radiation from emission channel 10E of the LIDAR system 10 to the optical fiber 20, and end 22 carries out the return transmission of radiation from the optical fiber 20 to the reception channel 10R of the LIDAR system 10. Using the above notations, $D_{ref}=L\cdot n_{eff}$ for this second configuration.

When the reference optical path comprises additional components, additional propagation lengths caused by these additional components may be taken into account by adapting the above expressions for the free-space propagation distance reference value $D_{ref}$, in order to obtain an even more precise calibration. The person skilled in the art will spontaneously be able to adapt the above expressions of $D_{ref}$ for this purpose.

For both configurations just described, relating to monostatic LIDAR systems, the length L of the optical fiber 20 is preferably chosen so that the corresponding free-space propagation distance value $D_{ref}$ is greater than 150 m. In this manner, the portion of the radiation which is retransmitted by the optical fiber 20 to the detection channel 10D of the LIDAR system 10 is temporally separated from any possible narcissus signal.

The optical fiber 20 is preferably arranged in the form of a compact coil, and so that its ends 21 and 22 are easily accessible.

Still for both configurations just described, the reference optical path may be provided with an intensity attenuator 24, in order to prevent the radiation used for the calibration, which propagates in the reference optical path instead of being backscattered by the particles in suspension in the air, does not cause saturation of the detection channel 10D. The attenuator 24 may be formed in multiple ways and have a variable level of attenuation. For example, it may be an iris diaphragm with adjustable aperture. For such couplings to the optical aperture(s) of the LIDAR system 10, a removable or reversible coupling mode may be provided, so that the LIDAR system 10 is operational for useful measurements carried out on particles present in the air, after the calibration has been carried out.

Furthermore, it is not necessary for the reference optical path used for the distance calibration of the LIDAR system 10 to be coupled to the same optical aperture(s) as the one(s) useful for a target or targets to be characterized. For example, in a monostatic LIDAR system configuration as represented in [FIG. 1*a*], the optical circulator 4 may have an additional optical aperture, which is designated by the reference 44. This additional optical aperture 44, which is of the combined input-output type, is not used for the useful measurements carried out on targets to be characterized. Thus, end 21 of the optical fiber 20 of the reference optical path, when this path consists of a round trip of the radiation within the optical fiber 20, can be connected to the additional optical aperture 44 of the optical circulator 4. When such configuration is used for the reference optical path and for its coupling to the LIDAR system 10, the reference optical path may also comprise radiation polarization control means. These polarization control means (not shown) ensure that radiation which enters this optical circulator 4 through optical aperture 41 comes out through the additional optical aperture 44, and that radiation which enters through this additional optical aperture 44 comes out through optical aperture 42, when optical aperture 43 is momentarily inhibited. In a known manner, such polarization control means may alternatively be integrated into the optical circulator 4, rather than into the reference optical path.

Furthermore, it may be preferable to optically couple end 21 of the optical fiber 20 to the emission channel 10E downstream of the optical amplifier 3, so that deformations that the optical amplifier 3 could produce identically affect radiation pulses transmitted to the optical fiber 20 and other pulses emitted in the direction of a target to be characterized.

Figure 2:
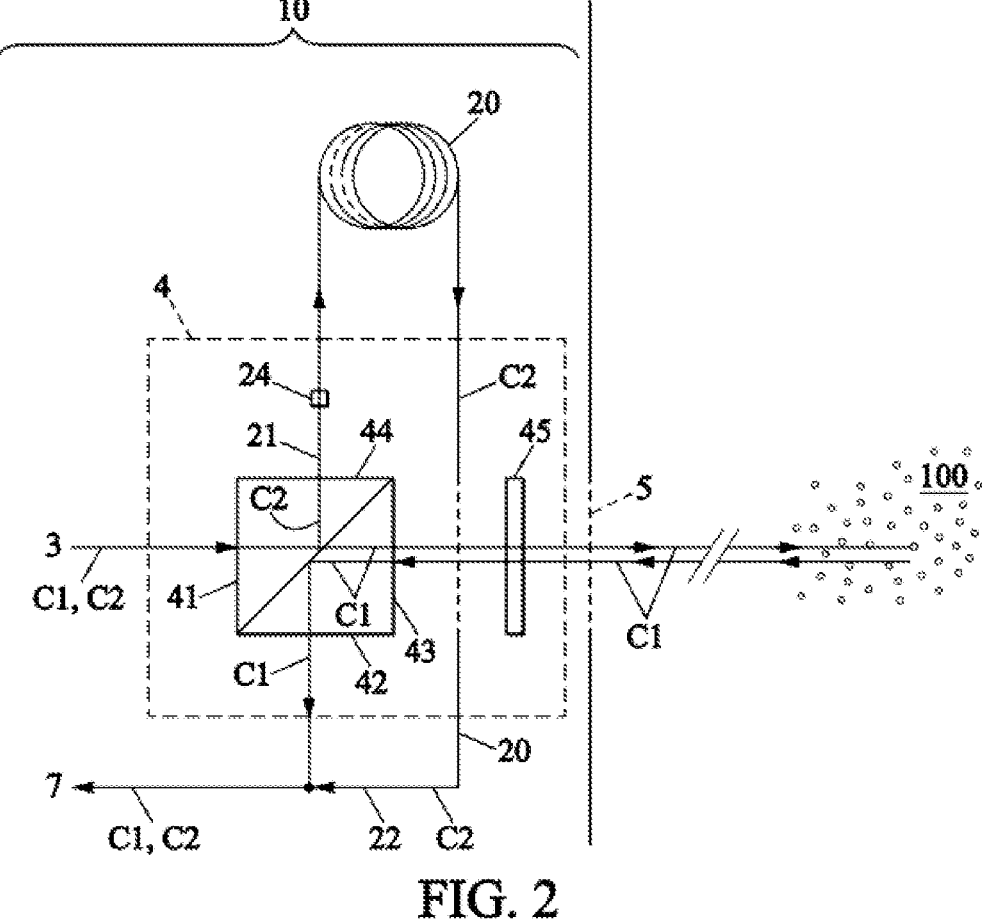
FIG. 2 illustrates a possible use of a type of optical circulator within a LIDAR system, in order to implement the invention.

[FIG. 2] shows one possible embodiment of the optical circulator 4 used in a LIDAR system 10 according to [FIG. 1*a*]. It also shows one possible implementation of this optical circulator 4, in which the optical fiber 20 is permanently coupled to the additional optical aperture 44. The optical circulator 4 comprises a polarizing cube with four faces respectively constituting optical apertures 41-44. The radiation to be emitted by the LIDAR system 10 comes from the optical amplifier 3. It comprises a main component C1 which has vertical linear polarization, and which is intended to be transmitted in the direction of the target to be characterized, designated by the reference 100. It further comprises a secondary component C2 which has horizontal linear polarization, and which is intended to be transmitted to the reference optical path. In a known manner, an intensity ratio between components C1 and C2 can be adjusted by rotating the polarizer cube relative to a direction of linear polarization of the laser radiation as coming from the optical amplifier 3, or relative to a linear polarizer (not shown) which may be located between the optical amplifier 3 and the optical circulator 4. The two components C1 and C2 enter the polarizer cube by the one of its faces which constitutes optical aperture 41. The main component C1, having vertical linear polarization, is transmitted without deviation through the opposite face of the polarizer cube, which constitutes optical aperture 43. A quarter-wave plate 45, which is located between optical aperture 43 of the polarizer cube and optical aperture 5 of the LIDAR system 10, converts the vertical linear polarization of this main component C1 into a left circular polarization. After retroreflection or backscattering on the target 100, a portion of the radiation of the main component C1 has right circular polarization, which is converted into horizontal linear polarization by the quarter-wave plate 45, and which once again enters the polarizer cube via optical aperture 43. It is then reflected within the polarizer cube to exit by the face which constitutes optical aperture 42, in the direction of the detector 7. Simultaneously, the secondary component C2, having horizontal linear polarization, after having also entered the polarizer cube via its face which constitutes optical aperture 41 of the optical circulator 4, is reflected within the polarizer cube to emerge via the face which constitutes the additional optical aperture 44. End 21 of the optical fiber 20 of the reference optical path is coupled to this optical aperture 44, and its opposite end 22 is coupled to the optical input of the detection channel 10D, in the direction of the detector 7. The secondary component C2 thus propagates selectively in the reference optical path. Under these conditions, when the distance at which the target 100 is located is different from the free-space propagation distance length $D_{ref}$ of the reference optical path, the heterodyne detection signal delivered by the detector 7 has two separate contributions: a first contribution which is produced by the main component C1 and which makes it possible to characterize the target 100, during a useful measurement sequence, and a second contribution which is produced by the secondary component C2 and which makes it possible to apply the calibration method of the invention at the same time as the useful measurement sequence is carried out.

In general, the coupling of the at least one of ends 21 and 22 of the optical fiber 20 respectively to the emission channel 10E or detection channel 10D of the LIDAR system 10 for its distance calibration, may be removable. In other words, the reference optical path may be designed to be optically coupled or decoupled reversibly to/from the emission 10E and detection 10D channels of the LIDAR system 10, according to a command appropriate for switching between a calibration sequence and a useful measurement sequence for the LIDAR system. Alternatively, when the optical fiber 20 is coupled to the emission 10E and detection 10R channels of the LIDAR system 10 in parallel with the optical path to and from the target 100, its coupling may be permanent so that it is possible to repeat the calibration process with each useful measurement sequence for characterizing the target. In the case of such a permanent coupling, it may advantageously be designed so that a main portion, for example more than 90%, or even more than 99%, of the radiation which comes from the emission channel 10E at each measurement sequence is emitted in the direction of the target 100, and that a minor complementary portion of this radiation is transmitted to the reference optical path.

The calibration sequence of the LIDAR 10 system consists of obtaining a measurement value for the time between emission and detection of a pulse which propagates in the reference optical path. It may be composed of an operating sequence of the LIDAR system 10, which is identical to an operating sequence as implemented for a useful measurement on the target to be characterized. The result of the calibration sequence is a measured time value $\Delta T_{ref}$ which is associated with the free-space propagation distance reference value $D_{ref}$ as defined above according to the configuration of the reference optical path. Thus, when an optical fiber 20 is used for the calibration sequence, of which the fiber length L corresponds to a value of 38 m for the free-space propagation distance reference value $D_{ref}$, a value close to 254 ns (nanoseconds) is obtained for the measured time $\Delta T_{ref}$. The calibration method makes it possible to take into account, for subsequent useful measurements, the difference which exists between $\Delta T_{ref}$ and the result of the quotient of $D_{ref}$ by C. The measurement value representative of the time $\Delta T_{ref}$ has been called the measurement reference value in the general part of this description.

A useful measurement sequence that is carried out to characterize a target, for example to measure the movement speed of a distributed set of particles in suspension in the air, provides another measured time value $\Delta T_{mes}$. This value has been called the measurement value in the general part of this description and is obtained in step /4/. The useful measurement sequence is carried out by decoupling the reference optical path from the LIDAR 10 system if necessary, so that each laser pulse emitted by the LIDAR 10 is backscattered by the particles and then in return is detected by the LIDAR system 10. Then, a value D can be obtained in step /5/ for the distance separating the set of particles from the LIDAR system 10, by combining the measured time values $\Delta T_{mes}$ and $\Delta T_{ref}$ with the free-space propagation distance reference value $D_{ref}$ as follows: $D=D_{ref}+(\Delta T_{mes}-\Delta T_{ref})\cdot C/2$. A residual error, which has been determined as equal to 0.02 m for a LIDAR system used as an example, may affect the distance calibration of the LIDAR system 10 when this calibration is carried out and then used for useful measurement sequences in the manner just described.

The residual error of the calibration method just described may partly result from the fact that the optical path followed by the radiation inside the LIDAR system 10 is not the same as outside the reference optical path, between the calibration sequence and the useful measurement sequence, and/or that the free-space propagation distance value cannot be determined with sufficient precision by calculation based on the length of the optical fiber 20. Such is the case, for example, when the reference optical path which has the configuration represented in [FIG. 1a] is coupled to the additional optical aperture 44 of the optical circulator 4, while the radiation is transmitted by input-output optical aperture 43 of the optical circulator 4 and by optical aperture 5 during a useful measurement sequence. To take this source of error into account, the four assemblies in [FIG. 3a]-[FIG. 3d] may be implemented and used to measure time differences $\Delta t_1$-$\Delta t_4$. In these figures, reference 11 designates a laser source which preferably may have the same wavelength value as the source 1 of the LIDAR system 10, and the reference 12 designates an optical coupler, for example an evanescent wave coupler of the 50-50 type. The source 11 is connected to one input of the optical coupler 12, and the other input of the optical coupler 12 is not used. The reference optical path, which may in particular consist of components 20, 23, and 24, and any additional components, is the same as the one used for step /2/ with the LIDAR system 10 of [FIG. 1a]. D1 and D2 are two photodetectors which, by comparison between the detection signals they respectively produce, provide measurements of time differences between a detection instant relative to photodetector D2 and a detection instant relative to photodetector D1, for the radiation portions respectively reaching these photodetectors. For example, the photodetectors D1 and D2 are fast or ultrafast photodiodes which are connected to inputs of an oscilloscope. Optical aperture 42 of the optical circulator 4 is never used in these assemblies, and photodetector D1 is always optically coupled to the same first output of the optical coupler 12.

Figure 3A:
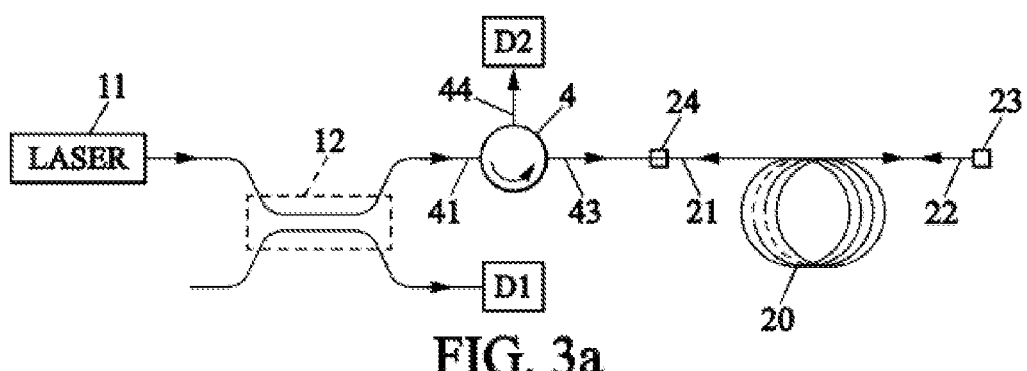
FIG. 3a to FIG. 3d are four diagrams of optical assemblies which can be used for improvement of the invention.

[FIG. 3a]: for this first assembly, optical input aperture 41 of the optical circulator 4 is coupled to a second output of the optical coupler 12, and the reference optical path is optically coupled to optical aperture 43 of the optical circulator 4. Photodetector D2 is optically coupled to the additional optical aperture 44 of the optical circulator 4. Optical aperture 42 of the optical circulator 4 is inhibited. Time difference $\Delta t_1$ which is thus measured takes into account the radiation propagation time in the reference optical path.

Figure 3B:
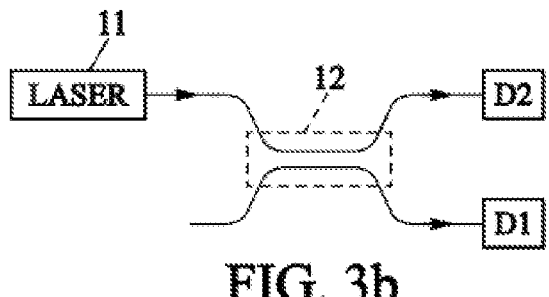

[FIG. 3b]: for this second assembly, the two photodetectors D1 and D2 are optically coupled directly, one-to-one, to the two outputs of the optical coupler 12. Time difference $\Delta t_2$ is thus measured. This second assembly makes it possible to take into account an asymmetry which could exist between the two outputs of the optical coupler 12.

Figure 3C:
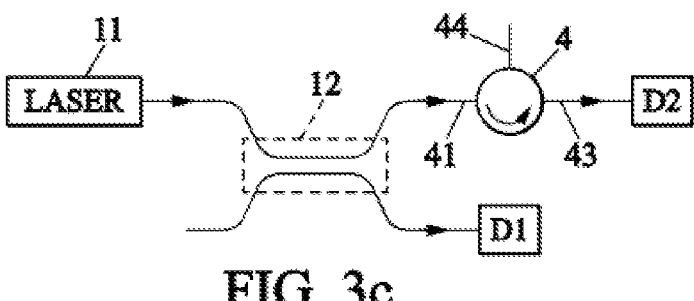

[FIG. 3c]: this third assembly uses the same coupling of the optical circulator 4 to the optical coupler 12 as implemented for the first assembly, but the reference optical path is eliminated and replaced by photodetector D2 at optical aperture 43 of the optical circulator 4. Optical apertures 42 and 44 of the optical circulator 4 are inhibited. Time difference $\Delta t_3$ is thus measured.

Figure 3D:
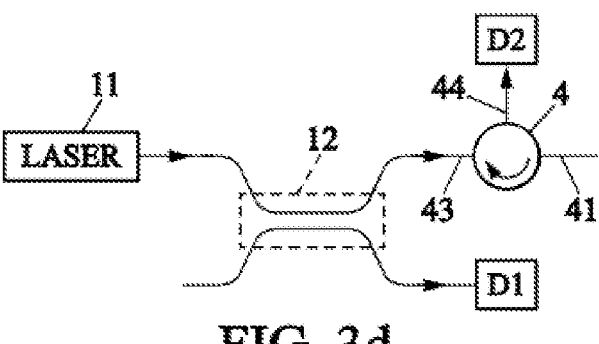

[FIG. 3d]: for this fourth assembly, the optical circulator 4 from the third assembly is turned around, then coupled by its optical input-output aperture 43 to the second output of the optical coupler 12. Photodetector D2 is optically coupled to the additional optical aperture 44 of the optical circulator 4, and optical apertures 41 and 42 of the latter are inhibited. Time difference $\Delta t_4$ is thus measured.

The free-space propagation distance reference value $D_{ref}$ to be associated with the measurement reference value $\Delta T_{ref}$ in order to constitute the calibration of the LIDAR system 10 is then $D_{ref}=C\cdot(\Delta t_1+\Delta t_2-\Delta t_3-\Delta t_4)$. This calibration is to be used to calculate the separating distance D during a useful measurement sequence, instead of the result of calculating $D_{ref}$ from the length L of the optical fiber 20 as mentioned above. It applies when the configuration of [FIG. 1a] is used with the reference optical path which is coupled to the additional input-output optical aperture 44 of the optical circulator 4 for the calibration sequence, and the output optical aperture 5 of the LIDAR system 10 which is coupled to the optical input-output aperture 43 of the optical circulator 4 for the useful measurement sequence. The correction which is thus made to the free-space propagation distance reference value $D_{ref}$ is approximately 0.02 ns, corresponding to a free-space propagation distance deviation of approximately 4 mm (millimeters).

Furthermore, the heterodyne detection signal obtained during a calibration sequence executed according to the invention by coupling the reference optical path to the LIDAR system 10, constitutes a temporal image of the shape of the radiation pulse as this pulse is received after propagation in the reference optical path. Its pulse envelope shape may be characterized for example by a full width value at half maximum, designated by FWHM, and a width at –30 dB (decibels), denoted $I_{30}$. The values FWHM=75 ns and $I_{30}$=120 ns were thus obtained, for a radiation pulse which extends in free-space propagation over approximately 22.5 m when considering its full width at half maximum, and over approximately 36 m at –30 dB (decibels). Assuming that the reference optical path does not introduce significant distortion of each pulse, such characterization of the pulse envelope shape allows verifying whether the LIDAR system 10 is operating correctly.

The heterodyne detection signal obtained during a calibration sequence executed according to the invention by coupling the reference optical path to the LIDAR system 10, also makes it possible to characterize a frequency shift of the pulse as detected after propagation in the reference optical path, in comparison to the pulse as produced by the emission channel of the LIDAR system 10. A frequency shift of 3 MHz (megahertz) was thus measured by way of example, for a radiation wavelength value equal to 1545 nm. Such a frequency shift may be caused by one or more component(s) of the LIDAR system 10 having variable behavior depending on the wavelength, and would thus alter the shape of the pulses, including changing their central wavelength value. Such a frequency shift calibration is particularly useful for anemometric measurements, to separate the contribution from the Doppler effect from the contribution internal to the LIDAR system 10 in the measured frequency shifts.

Finally, when the reference optical path is provided with an attenuator 24 which is variable, characterization of the envelope shape of the radiation pulse may be repeated for successive adjustments of the attenuator 24 which correspond to increasingly lower levels of intensity attenuation. When the level of attenuation is sufficiently high, no saturation of the detection channel 10D of the LIDAR system 10 occurs, so that such possible saturations do not alter a measurement result relating to a feature of the intended target which could depend on the envelope shape. On the other hand, when the attenuation level is decreased gradually and to a sufficient extent, the saturations caused by various components of the detection channel 10D of the LIDAR system 10 modify the shape of the envelope of the pulse as detected. This modification of the envelope shape may alter measurement results for certain characteristics of the target, as produced by the LIDAR system 10. For example, a modification of the envelope shape may alter a speed measurement result for the target, when this result is deduced from a frequency analysis of the heterodyne detection signal, combined with a Doppler effect calculation. Knowledge of the envelope deformation caused by the detection channel of the LIDAR system, when the intensity of the portion of the radiation retroreflected or backscattered by the target is too high, makes it possible to at least partially correct such error in the speed measurement result for the target. Furthermore, such characterization of the operation of the detection channel 10D may advantageously be used to provide a maximum limit for the intensity of the optical signal received by the detector 7, below which saturation is avoided.

These characterizations of envelope shape, frequency shift, and envelope deformation make it possible to verify operation of the LIDAR system starting from the calibration step, as proposed by the invention, in a manner which is particularly easy, fast, and economical compared to a LIDAR system verification session carried out in the shop.

Figure 4:
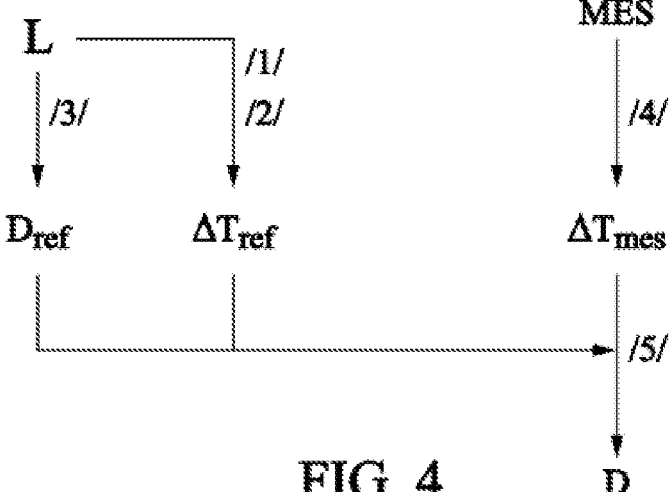
FIG. 4 is a block diagram of the method of the invention.

[FIG. 4] summarizes the principle of the invention. The supply of a reference optical path with optical fiber 20 of length L leads to obtaining the free-space propagation distance reference value $D_{ref}$ either by calculation or by using optical assemblies similar to those of figures [FIG. 3a]-[FIG. 3d]. This obtaining of the reference value $D_{ref}$ is step /3/ of the calibration method of the invention. Furthermore, the measurement reference value $\Delta T_{ref}$ is obtained during an execution of an operating sequence of the LIDAR system 10 which is dedicated to its calibration, with the reference optical path optically coupled to the LIDAR system 10. This obtaining of the reference value $\Delta T_{ref}$ which is independent of the obtaining of $D_{ref}$, constitutes steps /1/ and /2/ of the calibration method of the invention. Finally, the execution of an operating sequence of the LIDAR system 10 by pointing it at a target without using the reference optical path, constitutes a useful measurement MES. This useful measurement sequence provides measurement value $\Delta T_{mes}$, and corresponds to step /4/. Finally, the combination of value $\Delta T_{mes}$ with reference values $\Delta T_{ref}$ and $D_{ref}$ provides the result for the separating distance value D of the target, corresponding to step /5/ introduced in the general part of this description.

It is understood that the invention may be reproduced while modifying secondary aspects of the embodiments described above, but retaining at least some of the cited advantages. In particular, although the invention has been described in detail for monostatic LIDAR systems, it may also be applied to bistatic LIDAR systems. In addition, all of the numerical values cited were given for illustrative purposes only and may be changed depending on the application considered.

The invention claimed is:

1. A method for calibrating a LIDAR system, in order to provide a measurement reference value, which corresponds to a free-space propagation distance reference value, said measurement and free-space propagation distance reference values being intended to be used for calibration of the LIDAR system in order to evaluate a separating distance of at least one target to be characterized using said LIDAR system, the method comprising the following steps:

/0/ determining a distance limit value such that portions of the radiation emitted by the LIDAR system which are reflected by components internal to said LIDAR system, correspond to times between emission and detection which are equivalent to those of targets located at less than this distance limit value in front of an output optical aperture of the LIDAR system, the length of the reference optical path being selected such that the free-space propagation distance value is greater than the distance limit value determined in step /0/

/1/ coupling the LIDAR system to a reference optical path which is formed from at least one optical fiber efficient for guiding radiation emitted by the LIDAR system during an operation of said LIDAR system, so that at least a portion of the radiation travels the reference optical path between an emission channel and a detection channel of the LIDAR system, the reference optical path having a known length;

/2/ carrying out a distance measurement sequence using the LIDAR system coupled to the reference optical path as resulting from step /1/, in order to obtain a measurement value which is representative of a time of radiation propagation in the reference optical path, and which is intended to constitute the measurement reference value; then /3/ converting the known length of the reference optical path into a free-space propagation distance value for the radiation, according to a principle of propagation time equality, to form the free-space propagation distance reference value, and associating said free-space propagation distance reference value with the measurement reference value in order to constitute the calibration of the LIDAR system, wherein the reference optical path formed from the at least one optical fiber is incorporated within the LIDAR system, wherein the LIDAR system is of a monostatic type, whereby optical output and detection apertures of the LIDAR system are coincident.

2. The method according to claim 1, further comprising the following steps:

/4/ performing a measurement relating to said at least one target to be characterized by directing a line of sight of the LIDAR system towards said at least one target independently of the reference optical path, so as to collect another measurement value, said another measurement value being representative of the separating distance (D) of said at least one target; then /5/ calculating a value for the separating distance of said at least one target by combining said another measurement value with the measurement reference value and with the free-space propagation distance reference value, which corresponds to the length of the reference optical path.

3. The method according to claim 2, wherein the reference optical path which is formed from the at least one optical fiber is optically coupled to the LIDAR system in a continuous manner during step /4/, so that a first portion of a radiation emitted by said LIDAR system is used to carry out the measurement relating to said at least one target, and so that a second portion of the same radiation is used simultaneously to obtain the measurement value representative of the propagation time in the reference optical path, and wherein the measurement reference value which is composed of the time of propagation in the reference optical path as measured during step /4/ is used in step /5/.

4. The method according to claim 1, wherein the LIDAR system is adapted to carry out measurements according to a principle of heterodyne detection, including to provide the measurement reference value, in step /2/, and where appropriate to provide in step /4/ said another measurement value which is representative of the separating distance of said at least one target to be characterized.

5. The method according to claim 1, wherein, in step /1/, a first end of the optical fiber of the optical reference path is coupled to the emission channel of the LIDAR system, and a second end of said optical fiber, opposite to said first end, is coupled to the detection channel of the LIDAR system, so that at least a portion of the radiation emitted by the LIDAR system enters the optical fiber through said first end, then exits through said second end while being transmitted to the detection channel of the LIDAR system.

6. The method according to claim 1, wherein the LIDAR system is of a monostatic type; and the optical fiber has a first end and a second end, said second end being opposite to said first end and provided with a reflector so that radiation which propagates in the optical fiber from the first end is retroreflected by the reflector at the second end, inside said optical fiber and toward the first end; and step /1/ comprises coupling the LIDAR system to the optical fiber so that at least a portion of the radiation emitted by said LIDAR system enters said optical fiber through the first end, and at least a portion of the retroreflected radiation that exits through said first end is transmitted to the detection channel of the LIDAR system.

7. The method according to claim 6, wherein the emission and detection channels of the LIDAR system are coupled to an optical output aperture of said LIDAR system by an optical circulator, and wherein the first end of the optical fiber of the reference optical path is optically coupled to an optical input-output aperture of the optical circulator, said optical circulator transmitting the radiation, during step /2/, from the LIDAR system to the optical fiber through the optical input-output aperture of the optical circulator, and also transmitting the radiation received by said optical input-output aperture of the optical circulator and coming from the optical fiber, to the detection channel of the LIDAR system during step /2/.

8. The method according to claim 1, wherein the free-space propagation distance reference value is set in accordance with a differential assessment of delays in transmission, detection, and/or signal processing which are effective for the radiation of the LIDAR system, between emission and detection paths of said radiation which are used during step /2/, and other radiation emission and detection paths which are used to characterize said at least one target.

9. The method according to claim 1, wherein the LIDAR system is of a type with separate radiation pulses, for which the separating distance of said at least one target to be characterized is evaluated in accordance with a time between an emission of a radiation pulse toward said at least one target to be characterized, and a detection of a portion of the radiation pulse which has been reflected or backscattered by said at least one target to be characterized.

10. The method according to claim 9, further comprising performing at least one among:

a pulse envelope characterization, relating to a radiation pulse emitted and then detected by the LIDAR system;

a characterization of a frequency shift, as appearing between the radiation pulse as emitted by the LIDAR system and said radiation pulse as subsequently detected by said LIDAR system; and a characterization of a deformation of the radiation pulse envelope, said deformation being caused by saturation of the detection channel of the LIDAR system, each of said characterizations being carried out based on a detection signal produced by the LIDAR system during step /2/, for one or more successive executions of said step /2/.

11. The method according to claim 1, wherein the reference optical path is provided with an intensity attenuator arranged to attenuate an intensity of the radiation transmitted by the optical fiber to the detection channel of the LIDAR system.

12. The method according to claim 1, wherein the reference optical path which is formed from said at least one optical fiber is adapted to be reversibly coupled to the LIDAR system in step /1/, so as to be able to be optically decoupled from said LIDAR system during measurement sequences useful for characterizing targets.

13. The method according to claim 1, wherein the LIDAR system is adapted for at least one of the following applications:

meteorological measurements;

measurements of atmospheric pollutant diffusion;

measurements of shear of an atmospheric flow;

measurements of position and lifetime of at least one vortex present in a flow of fluid;

anemometric measurements performed from an aircraft in flight;

anemometric measurements performed to optimize an operation of a wind turbine; and anemometric measurements performed to adjust a flight of aircrafts in formation, or to adjust a flight of a drone.

14. The method of claim 11, wherein the attenuator is a variable attenuator.

15. A LIDAR system, provided with a reference optical path which is formed from at least one optical fiber efficient for guiding radiation emitted by the LIDAR system during operation of said LIDAR system, so that at least a portion of the radiation travels the reference optical path between an emission channel and a detection channel of the LIDAR system, the LIDAR system being adapted to implement a calibration method which is in accordance with claim 1, wherein the reference optical path formed from the at least one optical fiber is incorporated inside said LIDAR system.

16. A method for calibrating a LIDAR system, in order to provide a measurement reference value, which corresponds to a free-space propagation distance reference value, said measurement and free-space propagation distance reference values being intended to be used for calibration of the LIDAR system in order to evaluate a separating distance of at least one target to be characterized using said LIDAR system, the method comprising the following steps:

/1/ coupling the LIDAR system to a reference optical path which is formed from at least one optical fiber efficient for guiding radiation emitted by the LIDAR system during an operation of said LIDAR system, so that at least a portion of the radiation travels the reference optical path between an emission channel and a detection channel of the LIDAR system, the reference optical path having a known length;

/2/ carrying out a distance measurement sequence using the LIDAR system coupled to the reference optical path as resulting from step /1/, in order to obtain a measurement value which is representative of a time of radiation propagation in the reference optical path, and which is intended to constitute the measurement reference value; then /3/ converting the known length of the reference optical path into a free-space propagation distance value for the radiation, according to a principle of propagation time equality, to form the free-space propagation distance reference value, and associating said free-space propagation distance reference value with the measurement reference value in order to constitute the calibration of the LIDAR system, wherein the reference optical path formed from the at least one optical fiber is incorporated within the LIDAR system, wherein the reference optical path which is formed from said at least one optical fiber is adapted to be reversibly coupled to the LIDAR system in step /1/, so as to be able to be optically decoupled from said LIDAR system during measurement sequences useful for characterizing targets.

17. A LIDAR system, provided with a reference optical path which is formed from at least one optical fiber efficient for guiding radiation emitted by the LIDAR system during operation of said LIDAR system, so that at least a portion of the radiation travels the reference optical path between an emission channel and a detection channel of the LIDAR system, the LIDAR system being adapted to implement a calibration method which is in accordance with claim 16, wherein the reference optical path formed from the at least one optical fiber is incorporated inside said LIDAR system.

* * * * *